United States Patent
Zhong et al.

(10) Patent No.: US 11,845,146 B2
(45) Date of Patent: Dec. 19, 2023

(54) BRAZING WIRE, FORMING METHOD OF BRAZING WIRE AND FORMING MOLD OF BRAZING WIRE

(71) Applicant: ZHENGZHOU RESEARCH INSTITUTE OF MECHANICAL ENGINEERING CO., LTD., Henan (CN)

(72) Inventors: Sujuan Zhong, Henan (CN); Weimin Long, Henan (CN); Yinyin Pei, Henan (CN); Lei Zhang, Henan (CN); Xiupeng Li, Henan (CN); Yuanxun Shen, Henan (CN); Yunyue Li, Henan (CN); Luyi Wang, Henan (CN)

(73) Assignee: ZHENGZHOU RESEARCH INSTITUTE OF MECHANICAL ENGINEERING CO., LTD., Henan (CN)

( * ) Notice: Subject to any disclaimer, the term of this patent is extended or adjusted under 35 U.S.C. 154(b) by 0 days.

(21) Appl. No.: 17/620,106

(22) PCT Filed: Aug. 26, 2021

(86) PCT No.: PCT/CN2021/114714
§ 371 (c)(1),
(2) Date: Dec. 16, 2021

(87) PCT Pub. No.: WO2021/219149
PCT Pub. Date: Nov. 4, 2021

(65) Prior Publication Data
US 2022/0339743 A1    Oct. 27, 2022

(30) Foreign Application Priority Data
Apr. 25, 2021 (CN) .......................... 202110449539.5

(51) Int. Cl.
*B23K 35/02* (2006.01)
*B21C 1/02* (2006.01)

(52) U.S. Cl.
CPC ............ *B23K 35/0227* (2013.01); *B21C 1/02* (2013.01)

(58) Field of Classification Search
None
See application file for complete search history.

(56) References Cited

U.S. PATENT DOCUMENTS

2014/0008416 A1    1/2014   Visser et al.

FOREIGN PATENT DOCUMENTS

| CN | 2119974 | 10/1992 |
| CN | 2140272 | 8/1993 |

(Continued)

OTHER PUBLICATIONS

Machine translation from Espacenet of CN 202684353U (translated Mar. 7, 2023) (Year: 2013).*

(Continued)

*Primary Examiner* — Elizabeth Collister
(74) *Attorney, Agent, or Firm* — JCIP GLOBAL INC.

(57) ABSTRACT

A brazing wire includes a brazing tube having an inner cavity and a flux filled in the inner cavity. A trench is provided on an outer peripheral surface of the brazing tube, and the trench extends along an axis of the brazing tube or spirally extends around the axis. A forming mold of the brazing wire includes a mold body having a molding cavity therein. An inner wall of the molding cavity is provided with a protrusion. When the brazing wire passes through the forming mold, the protrusion is used to form the trench. The forming method of the brazing wire includes the following steps. The brazing tube passes through the forming mold, and the trench is formed on the outer peripheral surface of (Continued)

the brazing tube by the protrusion. The trench extends along the axis of the brazing tube or spirally extends around the axis.

3 Claims, 3 Drawing Sheets

(56) References Cited

FOREIGN PATENT DOCUMENTS

| CN | 2258801 | | 8/1997 | |
|---|---|---|---|---|
| CN | 101842186 | | 9/2010 | |
| CN | 202684353 | | 1/2013 | |
| CN | 202684353 U | * | 1/2013 | |
| CN | 102962598 | | 3/2013 | |
| CN | 101842186 B | * | 4/2013 | ......... B23K 35/0227 |
| CN | 102513726 | | 11/2014 | |
| CN | 104227268 | | 12/2014 | |
| CN | 104741814 | | 7/2015 | |
| CN | 204430585 | | 7/2015 | |
| CN | 205673777 | | 11/2016 | |
| CN | 206185343 | | 5/2017 | |
| CN | 207119910 | | 3/2018 | |
| CN | 109530978 | | 3/2019 | |
| JP | S63238996 | | 10/1988 | |
| JP | 2010125477 | | 6/2010 | |
| KR | 20020067860 | | 8/2002 | |

OTHER PUBLICATIONS

Machine translation of CN 101842186 B from Espacenet (translated May 19, 2023) (Year: 2013).*
"Office Action of China Counterpart Application", dated Feb. 7, 2022, p1-p8.
"International Search Report (Form PCT/ISA/220) of PCT/CN2021/114714," dated Jan. 19, 2022, p1-p5.
"Search Report of China Counterpart Application", dated May 29, 2023, p1-p2.

* cited by examiner (a) With trench (b) Without trench

BRAZING WIRE, FORMING METHOD OF BRAZING WIRE AND FORMING MOLD OF BRAZING WIRE

CROSS-REFERENCE TO RELATED APPLICATION

This application is a 371 of international application of PCT application serial no. PCT/CN2021/114714, filed on Aug. 26, 2021 which claims the priority benefit of China application no. 202110449539.5, filed on Apr. 25, 2021. The entirety of each of the above mentioned patent applications is hereby incorporated by reference herein and made a part of this specification.

FIELD OF THE DISCLOSURE

The disclosure relates to a brazing wire, a forming method of the brazing wire and a forming mold of the brazing wire.

DESCRIPTION OF RELATED ART

The brazing process often requires the use of brazing wire and flux. After the flux is melted, it can flow to the surface of the workpiece to remove the oxide film on the surface of the workpiece, thereby improving the quality of brazing.

For example, in the glasses industry, a pair of metal frames is normally composed of 20 to 30 parts, which are mainly glasses legs, frames, bridge, hinges, locking blocks, nose pads and screws, etc. Brazing is a conventional connection method for spectacle frames. Nowadays, glasses industry in China has a high annual output value and a large demand in domestic and foreign markets. However, most of the products are still mainly made of low-grade materials such as brass and zinc cupronickel. With the advancement of technology, the properties of metal materials for high-end glasses and related manufacturing processes, especially high-quality brazing materials and advanced processes that can be adapted for metal spectacle frames, is an important field of study for materials workers to explore. Currently, when brazing the spectacle frames, it is necessary to add flux and brazing filler metal separately. There are problems such as that brazing operation is troublesome, the amount of used flux is difficult to be uniform, and excessive flux contaminates the spectacle frame. Also, as being affected by the structure of the spectacles frame, it is difficult to clean up after brazing.

China patent publication of CN102513726B discloses a silver-based flux-cored wire and manufacturing method thereof. The raw material of wire is made into a rod shape, and after heating, the rod-shaped material is extruded into a hollow tube by a mold barrel of a pressurizing device to form a brazing tube. Besides, the powder flux is melted into a liquid state and pressed into the hollow tube to obtain a flux-cored wire. This process is easy to accurately control the amount of the flux, satisfies the matching of alloy brazing temperature, and makes it easy to clean after brazing.

However, during brazing, the heat used to melt the flux needs to be transferred from the outside to the inside through the hollow tube, so the flux has a slow melting rate, and it takes a long time for the flux to spread on the surface of the workpiece to remove the oxide film of the workpiece, which affects the quality of brazing process.

SUMMARY OF THE DISCLOSURE

The purpose of the disclosure is to provide a brazing wire, which can increase the melting rate of flux, reduce the time for flowing and spreading after brazing and improve the quality of brazing process. In the meantime, the disclosure further provides a forming method of the brazing wire and a forming mold of the brazing wire.

In the disclosure, the following technical solution is adopted for brazing wire.

A brazing wire, includes:
a brazing tube having an inner cavity; and
a flux filled in the inner cavity of the brazing tube.

The brazing tube is provided with a trench on the outer peripheral surface, and the trench extends along an axis of the brazing tube or spirally extends around the axis of the brazing tube.

Advantageous effects: With the above technical solution, the brazing tube is provided with a trench extending along the axis of the brazing tube or spirally extending around the axis of the brazing tube on the outer peripheral surface, which can reduce the heat transfer distance and increase the heat transfer area. As compared with the existing technology, the technical solution of the disclosure can increase the melting rate of flux, reduce the flowing and spreading time of brazing and improve the quality of brazing.

As a preferred technical solution: The cross section of the trench is V-shaped.

Advantageous effects: By adopting the above technical solution, the structure is simple, and the processing is convenient.

As a preferred technical solution: A depth of the trench is ¼ to ⅗ of a wall thickness of the brazing tube.

Advantageous effects: By adopting the above technical solution, it is possible to balance the thermal conductivity and structural strength of the brazing tube.

As a preferred technical solution: a number of the trench is three or more.

Advantageous effects: By adopting the above technical solution, it is possible to better ensure the melting rate of flux.

As a preferred technical solution: The trenches are uniformly distributed along the circumferential direction.

Advantageous effects: By adopting the above technical solution, great heat transfer uniformity can be achieved.

In the disclosure, the following technical solution is adopted for the forming mold of the brazing wire.

The forming mold includes a mold body, and a molding cavity is provided inside the mold body.

An inner wall of the molding cavity is provided with a protrusion. When the brazing wire passes through the forming mold, the protrusion is adapted to form the trench on the outer peripheral surface of the brazing tube.

Advantageous effects: With the above technical solution, when the brazing wire passes through the forming mold, the protrusion can form a trench on the outer peripheral surface of the brazing tube. The trench can reduce the heat transfer distance and increase the heat transfer area. Compared with the existing technology, the technical solution of the disclosure can increase the melting rate of flux for brazing wire, reduce the time for flowing and spreading after brazing and improve the quality of brazing process.

As a preferred technical solution: The cross-sectional shape of the protrusion is V-shaped, and a tip portion of the protrusion faces the center of the forming mold.

Advantageous effects: By adopting the above technical solution, the structure is simple, and the processing is convenient.

As a preferred technical solution: a number of protrusion is three or more.

Advantageous effects: By adopting the above technical solution, three trenches or more can be formed on the brazing tube, which can better ensure the melting rate of flux.

The disclosure adopts the following technical solution for the forming method of the brazing wire.

The forming method includes the following steps.

Enabling the brazing tube to pass through the forming mold, and forming a trench on the outer peripheral surface of the brazing tube by a protrusion provided on the inner wall of the molding cavity of the forming mold. The trench extends along the axis of the brazing tube or spirally extends around the axis of the brazing tube.

Advantageous effects: The above technical solution can be used to form a trench on the outer peripheral surface of the brazing tube. The trench can reduce the heat transfer distance and increase the heat transfer area. Compared with the existing technology, the technical solution of the disclosure can increase the melting rate of flux, reduce the time for flowing and spreading after brazing and improve the quality of brazing process.

As a preferred technical solution: The forming method further includes the following steps.

After the trench is formed on the brazing tube, enabling the brazing tube to pass through a forming mold with a circular cross-section, and to narrow an opening of the trench on the outer peripheral surface of the brazing tube. The forming mold with the circular cross-section is a forming mold having a molding cavity that has the circular cross-section.

Advantageous effects: The above technical scheme can be used to form a substantially-circular brazing filler metal, which prevents the trench from interfering the automatization of brazing and makes it easy to realize the automatization of brazing.

For the subject matter to be protected by this disclosure, each preferred technical solution for the same subject matter can be used individually. In the condition where combination is applicable, two or more preferred technical solutions for the same subject matter can also be combined freely to form a technical solution. No further description is incorporated herein, and such technical solution is incorporated in this disclosure in this form.

DESCRIPTION OF EMBODIMENTS

Figure 1:
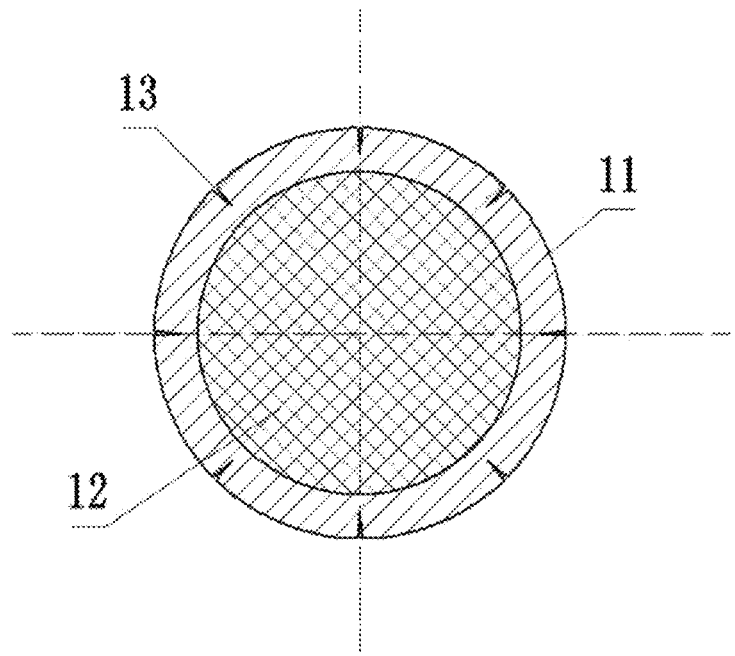
FIG. 1 is a schematic cross-sectional view of a first embodiment of a brazing wire in the disclosure.

In order to make the purpose, technical solutions, and advantages of the disclosure more clear, the following further describes the disclosure in detail with reference to the accompanying drawings and embodiments. It should be understood that the specific embodiments described here are only used to explain the disclosure and not to limit the disclosure, that is, the described embodiments are only a part of the embodiments of the disclosure, rather than all the embodiments. The elements of the embodiments of the disclosure generally described and illustrated in the drawings herein may be arranged and designed in various different configurations.

Therefore, the following detailed description of the embodiments of the disclosure provided in the accompanying drawings is not intended to limit the scope of the claimed disclosure, but merely represents selected embodiments of the disclosure. Based on the embodiments of the disclosure, all other embodiments obtained by those skilled in the art without creative work shall fall within the scope to be protected by the disclosure.

It should be noted that the terms "first" and "second" and other relational terms that may appear in the specific embodiments of the disclosure are only used to distinguish one object or operation from another object or operation. It is not necessarily required or implied that there is any such actual relationship or order between these objects or operations. Moreover, the possible terms "include", "comprise" or any other variants thereof are intended to cover non-exclusive inclusion, so that a process, method, article or device including a series of elements not only includes those elements, but also includes other elements which are not explicitly listed, or further include elements inherent to this process, method, article, or equipment. If there are no further restrictions, the possible occurrence of the sentence "includes one . . . " does not exclude the existence of other identical elements in the process, method, article, or equipment that includes the element.

In the description of the disclosure, unless otherwise clearly specified and limited, the terms "arranged", "linked", and "connected" that may appear should be interpreted in a broad sense. For example, they may be fixed or detachable connections, or integrally connected; it can be a mechanical connection or an electrical connection; it can be a direct connection or an indirect connection through an intermediate medium, and it can be the internal communication between the two components. For those skilled in the art, the specific meaning of the above terms in the disclosure should be comprehensible through specific circumstances.

In the description of the disclosure, unless otherwise clearly stipulated and limited, the term "provided with" that may appear should be interpreted in a broad sense. For example, the "provided" object can be a part of the subject, or it can be separated arranged from the subject and connected to the subject. The connection can be detachable or non-detachable. For those skilled in the art, the specific meaning of the above terms in the disclosure should be comprehensible through specific circumstances.

The disclosure will be further described in detail below in conjunction with embodiments.

The first embodiment of brazing wire in the disclosure.

As shown in FIG. 1, the brazing wire is used for the brazing of glasses, and the brazing wire includes a brazing tube 11 and a flux 12. The brazing tube 11 is a seamless tube with an inner cavity, and the flux 12 is filled in the inner cavity of the brazing tube 11. The manufacturing method of the brazing tube 11 and the filling method of the flux 12 belong to existing technology, and will not be further described in detail in the disclosure. In order to prevent the flux 12 from absorbing moisture and therefore affecting the activity of the flux 12, both ends of the brazing tube 11 are closed.

The brazing wire in the disclosure is unique in that, a plurality of trenches 13 are provided on an outer peripheral surface of the brazing tube 11, and the trench 13 has a V-shaped cross section and extends along an axis of the brazing tube 11. In this embodiment, there are eight trenches 13, which are uniformly distributed along the circumferential direction. The depth of the trench 13 is ½ of the wall thickness of the brazing tube 11, the width of opening is 0.08 h, and h is the depth of the trench. Through such configuration, it is possible to balance the thermal conductivity and structural strength of the brazing tube 11, and make the cross section of the brazing wire to be similar to a circle. As a preferred embodiment, the depth of the trench 13 is ¼ to ⅗ of the wall thickness of the brazing tube 11, and the width of the trench 13 after narrowing is 0.01 h to 0.12 h.

Figure 4:
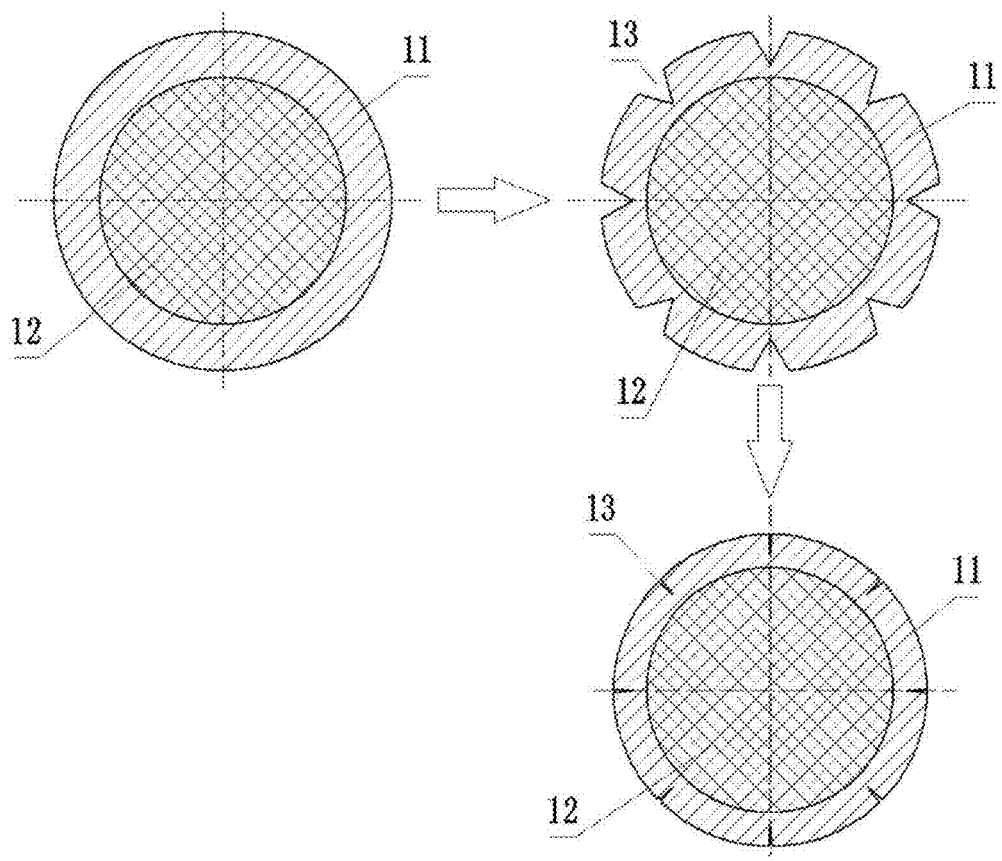
FIG. 4 is a schematic view of a molding process of a first embodiment of a forming method of a brazing wire of the disclosure.

As shown in FIG. 4, a forming method of the above-mentioned brazing wire is as follows, and this method is also the first embodiment of the forming method of the brazing wire of the disclosure.

Step 1: The flux 12 is filled into the seamless brazing tube 11.

Step 2: Passing the brazing tube 11 filled with flux 12 through a wire drawing die shown in FIG. 3 to form continuous trenches 13 on the brazing tube 11. The cross section of the trenches 13 is V-shaped, which is convenient for processing and facilitates subsequent diameter reduction. Using a wire drawing die to shape the wire belongs to an existing technology. The unique feature of the disclosure is that, the protrusions 23 are provided on the inner wall of the molding cavity 22 of the wire drawing die. When the brazing wire passes through the wire drawing die, the protrusions 23 allow the trenches 13 to be formed on the outer peripheral surface of the brazing tube 11 of the brazing wire, and the trenches 13 extend along the axis of the brazing tube 11.

Step 3: After the trenches 13 are formed on the brazing wire, the diameter of the brazing tube 11 of the brazing wire is reduced through a forming mold with a circular cross-section, so that the openings of the trenches 13 on the outer peripheral surface of the brazing tube 11 are narrowed. The forming mold with the circular cross-section is a common wire drawing die, and the cross-section of the molding cavity 22 is circular.

Figure 5:
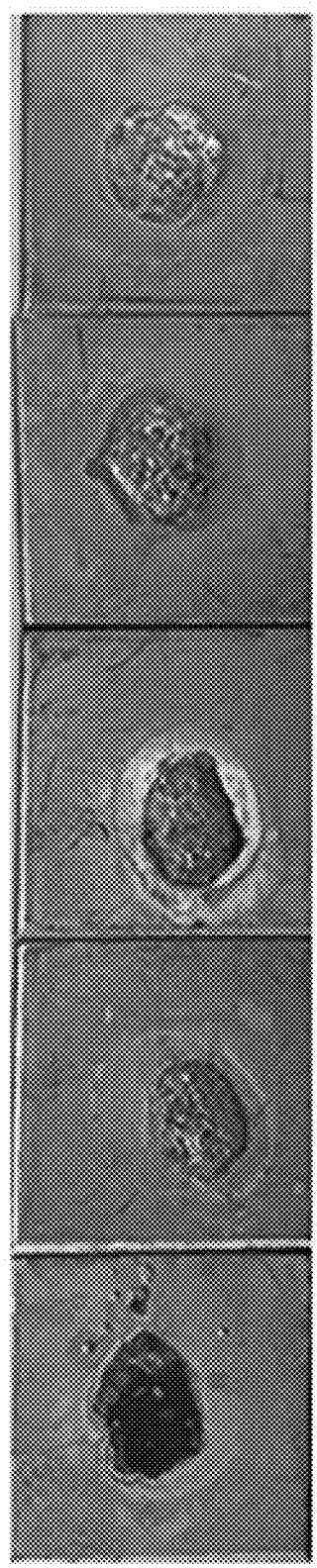
FIG. 5 is a comparison diagram of a moisturizing effect of brazing wire without a trench and with a trench.
Figure 5:
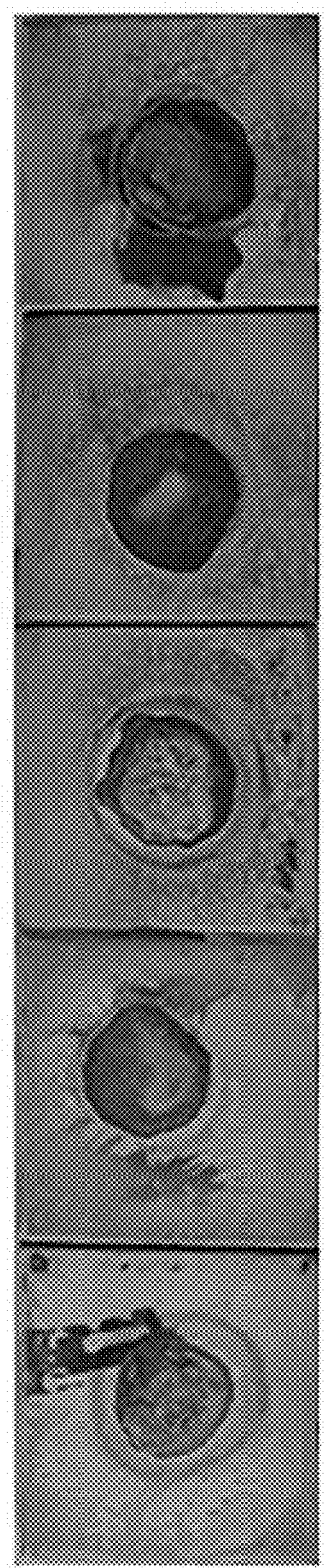

The principle of conventional brazing process is that, the flux first melts and removes the oxide film of the base material, and then the brazing filler metal melts and moisturizes the base material. The melting temperature of flux is generally lower than the melting temperature of brazing filler metal by about 30° C. The activity of flux directly affects the flow and spread of brazing filler metal, which in turn affects the brazing effect. In the brazing process, there are three heat transfer methods for brazing wire, which are thermal conduction, convection, and radiation. No matter which heating method is used, the heat energy needs to be transferred to the flux through the brazing filler metal on the surface. When the melting temperature of brazing filler metal and flux differs by about 30° C., it is possible that brazing filler metal will melt first, or brazing filler metal and flux will melt at the same time. Under the circumstances, the flux is not able to remove the oxide film on the base material in time, which will affect the flow and spread of brazing filler metal, please see (a) of FIG. 5. Regarding the glass brazing wire with trench of the disclosure, the brazing filler metal has a trench on the surface of the brazing filler metal, and the brazing filler metal skin at the trench is thinned. When heating is performed in the brazing process, the heat energy can be quickly transferred to the flux, so that the flux melts faster than the brazing filler metal, and the flux removes the oxide film of the base material quickly. The brazing filler metal has a better flow-laying effect after melting, as shown in (b) of FIG. 5. Moisturizing conditions in FIG. 5: brazing wire is Ag40Cu19Zn21Cd, weight is 0.2 g, temperature is 700° C., and time is 5 min.

In addition to facilitating automatic brazing of glasses, the above brazing wire can also achieve brazing connection with the least flux, so that the amount of flux can be accurately controlled to achieve the purpose of protecting the environment.

The second embodiment of brazing wire in the disclosure.

Figure 2:
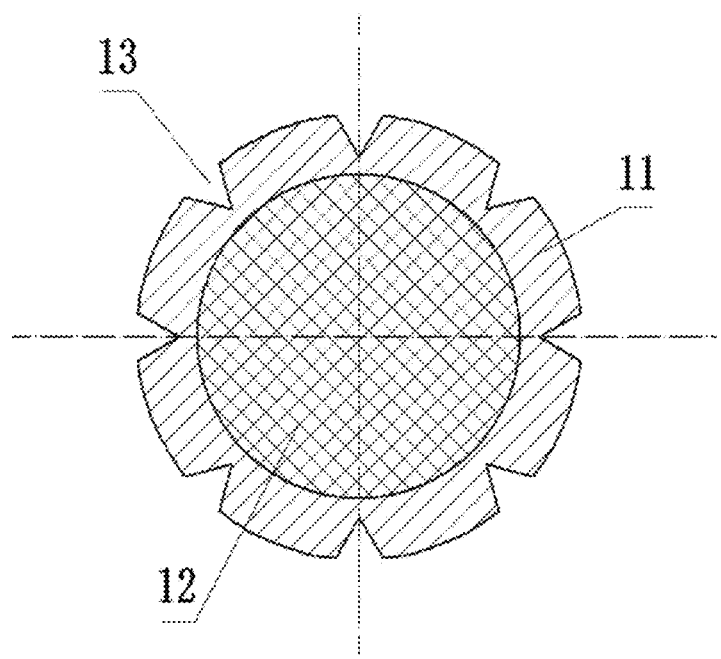
FIG. 2 is a schematic cross-sectional view of a second embodiment of a brazing wire in the disclosure.

The difference of the brazing wire between the first embodiment and the second embodiment is that, as shown in FIG. 2, in the embodiment, the width of the trench 13 on the outer peripheral surface of the brazing tube 11 is relatively large, and is not subjected to the diameter reduction process in the above step 3.

The first embodiment of the forming mold of the brazing wire in the disclosure.

Figure 3:
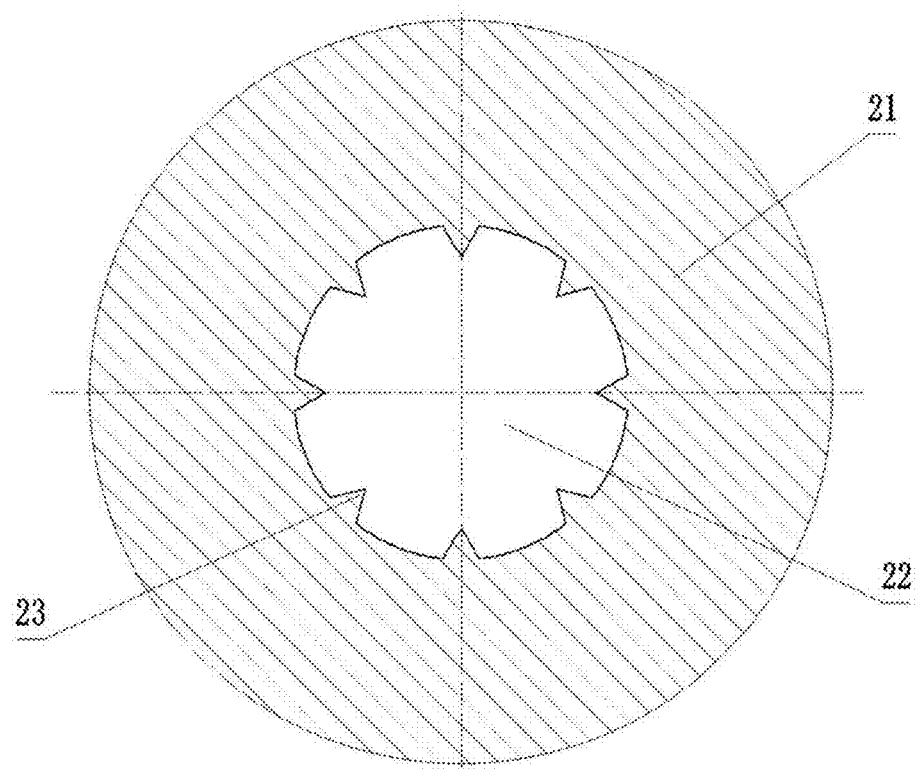
FIG. 3 is a schematic cross-sectional view of a first embodiment of a forming mold of a brazing wire in the disclosure.

As shown in FIG. 3, the forming mold of the brazing wire is provided with the protrusions 23 on the inner wall of the molding cavity 22. When the brazing wire passes through the forming mold, the protrusions 23 are used to respectively form the trenches 13 on the outer peripheral surface of the brazing tube 11.

The second embodiment of the forming method of the brazing wire in the disclosure.

The difference between the first embodiment and the second embodiment is that, the forming method of the second embodiment only includes step 1 and step 2 in the first embodiment, and does not include the diameter reduction process of step 3.

The third embodiment of the forming method of the brazing wire in the disclosure.

This embodiment is different from the first or the second embodiment in that, this embodiment first separately performs the processing in step 1 and step 2 on the brazing tube 11, and finally fills the flux 12.

In the above embodiment of the brazing wire, the cross section of each trench 13 is V-shaped. In other embodiments of the brazing wire, the cross section of the trench 13 may also be other shapes, such as U-shaped, arc-shaped, trapezoidal, and so on. Correspondingly, in other embodiments of the forming mold of the brazing wire, each protrusion 23 on the inner wall of the molding cavity 22 may also have other shapes, such as U-shaped, arc-shaped, trapezoidal, and so on.

In other embodiments of brazing wire, the number of trenches 13 can also be increased or decreased, for example, 3, 4, 5, 6, 7, 9, or 10 trenches, etc. may be provided, or only 1 or 2 trenches may be provided. Correspondingly, in other embodiments of the forming mold of the brazing wire, the protrusions 23 on the inner wall of the molding cavity 22 can also be provided in quantity of 3, 4, 5, 6, 7, 9, or 10, etc.; alternatively, only 1 or 2 protrusions may be provided.

The above are only the preferred embodiments of this disclosure and are not intended to limit this disclosure. The scope to be protected by the disclosure is subject to the claims. Any equivalent structural changes made using the content of the description and drawings of this disclosure are not intended to limit this disclosure, and should be included in the scope to be protected by the disclosure as well.

What is claimed is:

1. A brazing wire, comprising:
a brazing tube, having an inner cavity; and
a flux, filled in the inner cavity of the brazing tube;
wherein the brazing tube is provided with a trench on an outer peripheral surface, and the trench extends along an axis of the brazing tube or spirally extends around the axis of the brazing tube, wherein a cross section of the trench is V-shaped, a depth of the trench is ¼ to ⅗ of a wall thickness of the brazing tube, and a width of an opening of the trench is 0.01 to 0.12 times the depth of the trench.

2. The brazing wire according to claim 1, wherein a number of the trench is three or more.

3. The brazing wire according to claim 2, wherein the trenches are uniformly distributed along a circumferential direction.

* * * * *